(12) United States Patent  
Goyet

(10) Patent No.: US 9,111,188 B2
(45) Date of Patent: Aug. 18, 2015

(54) ELECTRONIC ENTITY WITH CONTACT AND REMOTE COMMUNICATION MEANS

(75) Inventor: Christophe Goyet, Lyons (FR)

(73) Assignee: OBERTHUR TECHNOLOGIES, Colombes (FR)

( * ) Notice: Subject to any disclaimer, the term of this patent is extended or adjusted under 35 U.S.C. 154(b) by 1447 days.

(21) Appl. No.: 11/919,551

(22) PCT Filed: Jul. 24, 2006

(86) PCT No.: PCT/FR2006/001797
§ 371 (c)(1),
(2), (4) Date: Nov. 18, 2009

(87) PCT Pub. No.: WO2007/012738
PCT Pub. Date: Feb. 1, 2007

(65) Prior Publication Data
US 2010/0060415 A1  Mar. 11, 2010

(30) Foreign Application Priority Data

Jul. 25, 2005 (FR) ...................................... 05 07887

(51) Int. Cl.
*G06K 7/06* (2006.01)
*G06K 19/07* (2006.01)
*G06K 19/077* (2006.01)

(52) U.S. Cl.
CPC ...... *G06K 19/0723* (2013.01); *G06K 19/07716* (2013.01); *G06K 19/07769* (2013.01)

(58) Field of Classification Search
CPC ... G06Q 20/32; G06Q 20/34; G06Q 20/3278; G06K 19/07749; G06K 19/06187; G06K 19/0723; G07F 7/1008; H04B 1/3816; H04W 12/06

USPC .............. 340/5.74, 10.1–10.5, 5.61; 235/441, 235/451, 492, 493
See application file for complete search history.

(56) References Cited

U.S. PATENT DOCUMENTS

| | | | | |
|---|---|---|---|---|
| 4,764,666 A | * | 8/1988 | Bergeron | ........................ 463/25 |
| 5,206,495 A | | 4/1993 | Kreft et al. | |
| 5,929,414 A | * | 7/1999 | Saitoh | .......................... 235/380 |

(Continued)

FOREIGN PATENT DOCUMENTS

| | | |
|---|---|---|
| DE | 19908285 A1 | 8/2000 |
| DE | 100 28 821 A1 | 12/2001 |

(Continued)

OTHER PUBLICATIONS

European Search Report dated Jul. 24, 2012, from corresponding EP application.

(Continued)

*Primary Examiner* — Brian Zimmerman
*Assistant Examiner* — An T Nguyen
(74) *Attorney, Agent, or Firm* — Young & Thompson

(57) ABSTRACT

An electronic entity includes contact communication elements (4) and remote communication elements (6). Members (2, K) are also provided to authorize an exchange of certain data at least via the remote communication elements based on the prior reception of an instruction via the contact communication elements. A terminal for communication with such an electronic entity as well as methods for controlling and for customizing the electronic entity are disclosed.

22 Claims, 3 Drawing Sheets

(56) References Cited

U.S. PATENT DOCUMENTS

| | | | |
|---|---|---|---|
| 5,999,713 A | 12/1999 | Reiner et al. | |
| 6,025,780 A | 2/2000 | Bowers et al. | |
| 6,138,918 A | 10/2000 | Tarbouriech et al. | |
| 6,424,029 B1 | 7/2002 | Giesler | |
| 6,776,339 B2* | 8/2004 | Piikivi | 235/451 |
| 7,344,074 B2* | 3/2008 | Markkanen et al. | 235/451 |
| 8,320,962 B2* | 11/2012 | Wilson et al. | 455/557 |
| 8,594,563 B2* | 11/2013 | Waters et al. | 455/41.1 |
| 2003/0075601 A1* | 4/2003 | Yagi et al. | 235/382 |
| 2005/0045720 A1* | 3/2005 | Fruhauf | 235/440 |
| 2005/0078498 A1* | 4/2005 | Waters et al. | 365/1 |
| 2006/0086806 A1* | 4/2006 | Conraux et al. | 235/492 |
| 2006/0113381 A1* | 6/2006 | Hochstein et al. | 235/382 |
| 2006/0283960 A1* | 12/2006 | Top | 235/492 |
| 2007/0225038 A1* | 9/2007 | Takeda | 455/558 |
| 2009/0215385 A1* | 8/2009 | Waters et al. | 455/1 |
| 2010/0060415 A1* | 3/2010 | Goyet | 340/5.74 |
| 2013/0063253 A1* | 3/2013 | Rashid et al. | 340/10.5 |
| 2013/0078921 A1* | 3/2013 | Wilson et al. | 455/41.1 |

FOREIGN PATENT DOCUMENTS

| | | |
|---|---|---|
| EP | 0 945 828 A2 | 9/1999 |
| EP | 1 258 831 A2 | 11/2002 |
| FR | 2 809 516 A | 11/2001 |
| JP | 62102387 A | 5/1987 |
| JP | 2000163546 A | 6/2000 |
| JP | 2001511574 A | 8/2001 |
| JP | 2002197432 A | 7/2002 |
| JP | 2005173871 A | 6/2005 |
| JP | 2005222097 A | 8/2005 |
| WO | 9837526 A1 | 8/1998 |
| WO | 9916019 A1 | 4/1999 |

OTHER PUBLICATIONS

Japanese Office Action dated Dec. 13, 2011, from corresponding JP application.

Japanese Office Action dated Jul. 10, 2012, from corresponding JP application.

\* cited by examiner

ELECTRONIC ENTITY WITH CONTACT AND REMOTE COMMUNICATION MEANS

BACKGROUND OF THE INVENTION

1. Field of the Invention

The invention concerns an electronic entity with contact communication means and remote communication means, a communication terminal with such an electronic entity, and methods of controlling and personalizing that electronic entity.

2. Description of the Related Art

An electronic entity, such as a microcircuit card, for example, which generally includes electronic circuits adapted to store information, has means for communication with the outside world, in order in particular to exchange information held by the electronic entity with external devices, of the reader or terminal type.

Among the communication means commonly used, a distinction is made between contact communication means, for which physical contact between the electronic entity and the terminal is a necessary condition for setting up communication, and remote communication means, thanks to which communication between the electronic entity and a reader is possible without physical contact between these two elements, generally with a range of the order of a few centimeters.

Moreover, certain electronic entities combine communication means of the aforementioned two types, in which case the "contact" and "contactless" modes of operation can be organized in accordance with the required functions of the device for each of the communication modes, as described for example in the U.S. Pat. No. 5,206,495 and U.S. Pat. No. 5,999,713.

Although the use of contactless communication means is known for its practicality (because no accurate positioning of the electronic entity is necessary for the exchange of information), it nevertheless has the drawback of a risk of unintentional exchange of information, for example through setting up communication not wanted by the user on passing near a reader. This problem is particularly serious if the electronic entity holds confidential information, as in the case of an electronic passport, for example.

Attempts have therefore already been made in the art to apply measures to avoid this unwanted exchange of data, sometimes known as "antiskimming" measures.

In this line of thinking, it is proposed in patent application WO 99/16019 to place a switch on the upper face of a microcircuit card to make the reception of data by the card possible only after activation of the switch. However adding such a switch to the electronic entity gives rise to problems of production and reliability, (for example in the case of repetitive flexing of the electronic entity as defined by the ISO standard 7816), and increases its fabrication cost.

This is probably why it is proposed in the U.S. Pat. No. 6,424,029 to use a switch of the capacitive type, better adapted to the general composition of electronic entities carrying information, in particular in the case of microcircuit cards. Although this solution reduces the problems that have just been referred to, it does not succeed in avoiding them completely.

Moreover, the solutions that have just been outlined lack flexibility and in particular rule out envisaging limiting access to the contactless communication mode, for example by means of a password.

BRIEF SUMMARY OF THE INVENTION

In this context, the invention proposes an electronic entity comprising contact communication means and remote communication means, characterized by means for authorizing an exchange of certain data at least via the remote communication means as a function of the reception before an instruction via the contact communication means.

The possibility of exchanging data via the remote communication means can thus be managed by way of the contact connection, for example by means of a terminal.

The exchange of data to which the authorization relates is, for example, the sending of certain data at least and/or the reception of certain data at least.

In a first embodiment that can be envisaged, the electronic entity also comprises means for storing activation information controlled by said instruction and means for authorizing the exchange (sending and/or receiving) of said data via the remote communication means in the presence of said activation information.

Thus the reception of the instruction can be separated from the exchange (for example the sending) of data, for example on the temporal plane.

In a complementary way, the electronic entity can also comprise means for inhibiting the exchange of said data via the remote communication means in the absence of said activation information.

When the remote communication means comprise an antenna, according to a second embodiment that can be envisaged, said means for authorizing an exchange comprise means for commanding connection of the antenna to a microcircuit on the basis of said instruction. The authorization and the inhibition of the exchange (for example sending and/or receiving) are then particularly effective.

The electronic entity is, for example, a microcircuit card conforming to the ISO standard 14443 and/or the ISO standard 7816.

The invention also proposes a terminal comprising contact communication means with an electronic entity comprising remote communication means, characterized by means for sending, via the contact communication means, an instruction intended to condition an exchange of certain data at least via the remote communication means.

Such a terminal can manage the authorization of exchange by the remote communication means of the electronic entity. The exchange to which the authorization relates can be sending and/or receiving data.

Such a terminal can be portable: it can in particular be an ad hoc portable terminal for managing the authorization of exchange by the remote communication means of the electronic entity.

The invention further proposes a method of controlling an electronic entity comprising contact communication means and contactless communication means, characterized by the following steps:

reception of an activation instruction via the contact communication means;

authorization of exchange of certain data at least via the remote communication means on reception of said activation instruction.

The possibility of exchanging the data via the remote communication means is thus commanded by the activation instruction, with the advantages already mentioned.

In this method, a step of exchanging (sending and/or receiving) said data via the remote communication means is conditioned by said authorization, for example.

In one possible embodiment, authorization is effected by setting activation information to a predetermined value and said conditional sending step comprises the following steps:

verification that the value of the activation information is equal to the predetermined value;

exchange (for example sending) of said data via the remote communication means only in the case of positive verification.

This method is practical to implement and has the advantages already mentioned in terms of separating authorization and exchange.

The method can equally comprise a step of setting the activation information to a value that is the complement of the predetermined value at a particular time.

In another possible embodiment, the method includes a step of inhibition of the exchange of said data at a particular time.

The particular time can correspond to the reception of an end of communication command by the remote communication means, enabling the instruction to authorize only one communication.

The particular time can be determined by a time-delay, enabling the duration of the authorization to be time-limited.

The particular time can be reached after reception of a predetermined number of commands via the remote communication means, enabling the possibilities of use of the authorization to be limited.

The particular time can correspond to the completion of a communication initialization step.

The invention finally proposes a method of personalizing an electronic entity comprising contactless communication means characterized by a step of writing activation information intended to condition the exchange of certain data at least via the remote communication means.

It is therefore possible to determine, during the personalization of the electronic entity, if the use of the contactless communication means will be authorized by default.

Said activation information can moreover be modified on reception of an instruction via contact communication means of the electronic entity. This refers to a secure instruction, for example.

This method can further comprise a step of writing configuration information representing conditions for modification of the activation information. Thus the electronic entity can be configured in respect of the possibilities of using the remote communication means during personalization as a function of its subsequent use, without this involving any modification of the circuits used.

BRIEF DESCRIPTION OF THE DRAWINGS

Other features and advantages of the invention will become apparent in the light of the following description, given with reference to the appended drawings, in which.

DETAILED DESCRIPTION OF THE PREFERRED EMBODIMENTS

Figure 1:
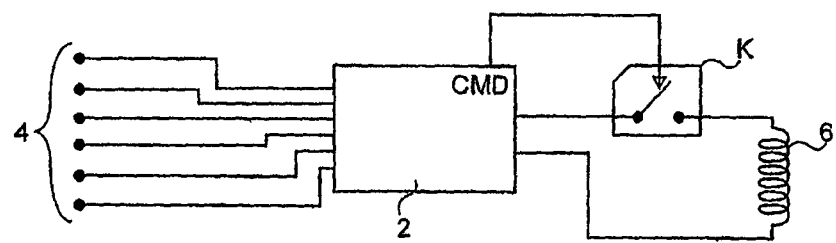
FIG. 1 represents a first example of an electronic entity conforming to the teachings of the invention.

The electronic entity represented by way of example in FIG. 1 comprises a microcircuit 2 (for example a secure microcontroller as usually employed in smart cards) adapted to communicate with other electronic devices by means of contacts 4, each contact being connected to a terminal of the microcircuit, and by means of a magnetic antenna 6, formed by a winding comprising a plurality of turns, for example.

The magnetic antenna 6 is connected to two terminals of the microcircuit through a switch K controlled via a control terminal CMD of the microcircuit 2. Accordingly, at the command of a signal generated at the terminal CMD, the microcircuit can command the connection of the antenna 6 to the microcircuit 2, and thus authorize or inhibit the use of the remote communication means of which this antenna 6 forms part.

The general operation of this device is described next with reference to FIG. 2.

It will first be noted that, in this embodiment, the electronic entity is supplied with electrical power only when it is connected by its contact communication means (set of contacts 4) to an external device of the terminal type, which forms an electrical connection with each of the contacts 4 and thus in particular supplies electrical power to the electronic entity.

The electrical switch K is, for example, open in the absence of the electrical power supply (and in particular in the absence of any signal at the terminal CMD, for example), so that the remote communication means comprising the antenna 6 cannot be used if the electronic entity is not connected (by means of the contacts 4) to the terminal that supplies it with power: in the present embodiment, the electronic entity is not adapted to operate only on the basis of a remote power feed provided by the antenna 6.

Figure 2:
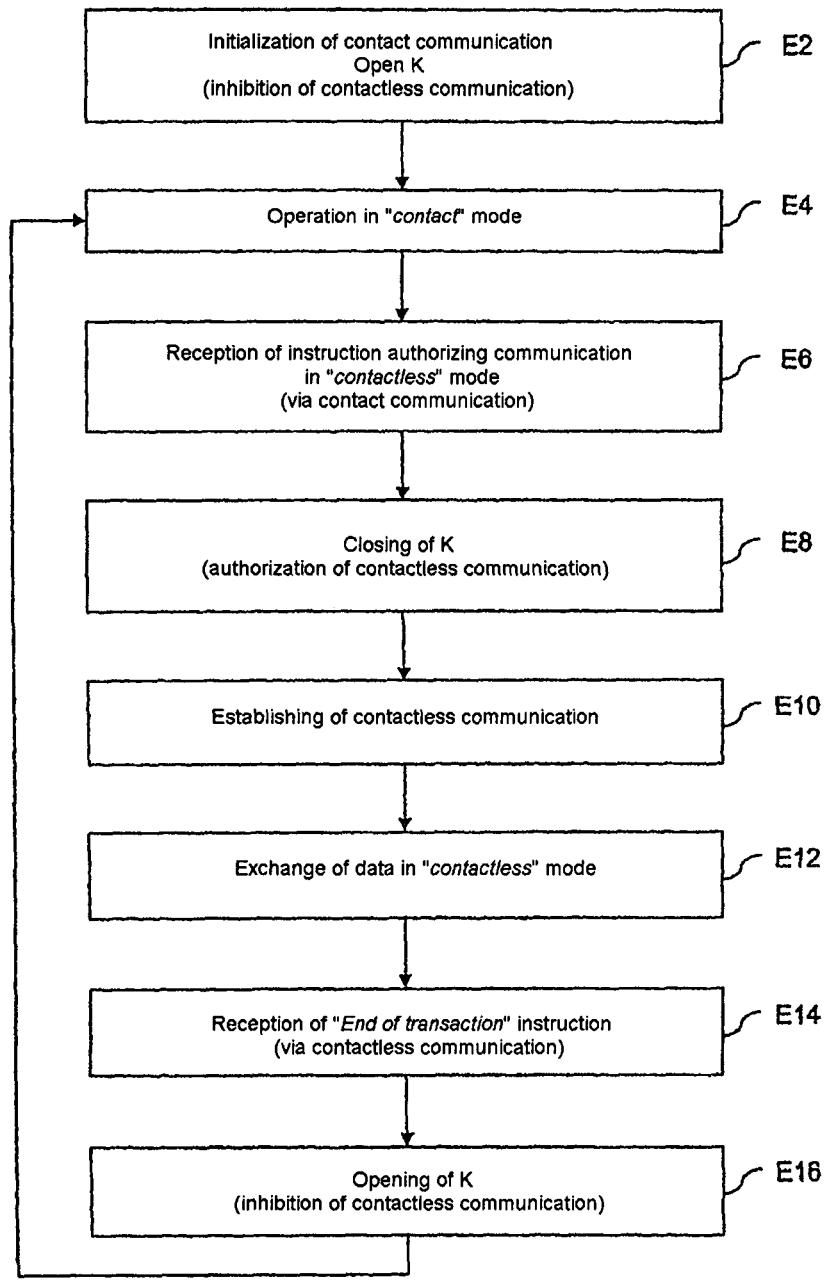
FIG. 2 is a flowchart showing the general working of the electronic entity from FIG. 1.

The general diagram of the working of the electronic entity from FIG. 1 therefore begins with the connection of the electronic entity to a terminal (via the contacts 4), which causes the initialization of communication between the electronic entity (that is to say the microcircuit 2) and the terminal (for example microcircuit type means in the terminal), as represented in the step E2 in FIG. 2.

During the initialization step, the switch K is opened, which inhibits contactless communication as explained hereinabove. The switch K is opened by the microcircuit 2 placing on the terminal CMD the potential that causes the switch K to open, for example a potential representing a logic level 0.

The electronic entity can then operate normally in "contact" mode, during which an exchange of data takes place between the electronic entity and the terminal to which it is connected, for example (step E4).

During these exchanges of data, the electronic entity can in particular receive an instruction authorizing contactless mode communication, as represented in the step E6.

If the microcircuit 2 of the electronic entity is controlled in its operation by operation codes received from the terminal, such an instruction is a particular operation code, for example. Alternatively, it could be an item of data (such as a secret code entered by the user on the terminal, for example) whose correctness is interpreted by the microcircuit 2 as an instruction authorizing "contactless" mode communication.

On reception of this instruction during the step E6, the microcircuit commands the closing of the switch K in the step E8 (for example by causing the terminal CMD to go to a potential corresponding to the logic level 1); thus the antenna 6 is connected at both ends to the microcircuit 2, which enables the electronic entity to communicate with an external device via that antenna 6, that is to say via the contactless communication means.

In the present embodiment, as described hereinafter, the closure of the switch K continues until the end of communication via the contactless communication means. Alternatively, contactless communication could be authorized only for a predetermined time (by a time-delay at the end of which the potential at the terminal CMD returns to the logic 0 level). Other variants can also be envisaged, as explained with reference to the second embodiment.

Once the switch K is closed, the electronic entity is able to set up contactless communication with a reader designed for this purpose (associated with the contact communication terminal or not), as represented in the step E10, enabling an exchange of data in "contactless" mode between the electronic entity and the reader, as indicated in FIG. 2 by the step E12.

At the end of the contactless mode dialog between the electronic entity and the reader, that is to say when these two devices have carried out the intended exchanges of data, the electronic entity receives an "end of transaction" instruction, for example the "DESELECT" instruction defined in the ISO standard 1443-4, as represented in the step E14.

On reception of such an instruction, the microcircuit 2 commands the opening of the switch K (by placing a logic level 0 on the terminal CMD in the example described here), which inhibits contactless communication by virtue of the fact that the antenna 6 is no longer connected to the microcircuit 2, as represented in the step E16.

As already indicated, contactless communication could instead be inhibited (here by opening the switch K) subject to other conditions, such as a certain time from authorization of communication, the electronic entity leaving the field of the reader, or otherwise, also as mentioned hereinafter.

Operation then resumes at the step E4 with management of the "contact" mode.

It will be noted that the embodiment that has just been described is particularly advantageous when a remote reader must communicate with the electronic entity even though the latter is also connected to a contact terminal. It may be, for example a question of a microcircuit card inserted into an appropriate terminal of a vehicle when the latter passes under a gantry provided with a remote reader. The exchange of data between the electronic entity and the remote reader (for example to open a barrier and/or to pay a toll) can therefore be subject to particular conditions managed by the contact terminal placed in the vehicle, for example the entry of a secret code on the terminal by the user or operation of a control switch on the steering wheel.

A second embodiment of the invention is described next with reference to FIGS. 3 to 6.

Figure 3:
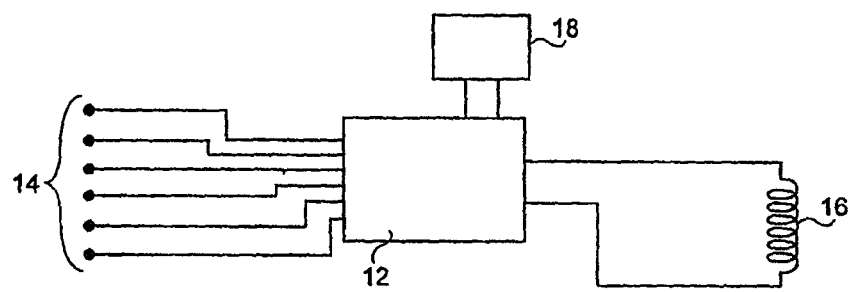
FIG. 3 represents a second example of an electronic entity conforming to the teachings of the invention.
Figure 4:
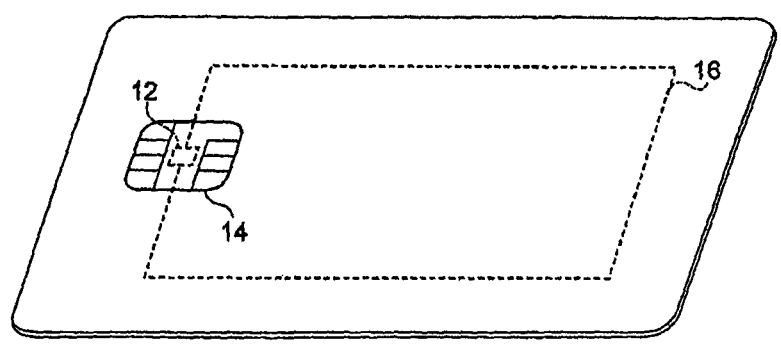
FIG. 4 represents one possible example of the physical constitution of the electronic entity from FIG. 3.

FIG. 3 represents the main elements of a second embodiment of the electronic entity: this electronic entity comprises a microcircuit 12 (for example a microprocessor) that can be connected to an external device of the terminal type by means of contacts 14 in order to set up "contact" communication between the electronic entity and the terminal.

The electronic entity also includes an antenna 16 connected at each end to a corresponding terminal of the microcircuit 12 (without there being provision for interrupting the connections between the antenna 16 and the microcircuit 12, in contrast to the first embodiment described hereinabove).

The antenna 16 is part of the remote communication means of the electronic entity.

A rewritable memory 18 (for example a nonvolatile memory of the electronically erasable and programmable type (EEPROM)) is also connected to the microcircuit 12.

It will be noted that, in this embodiment, the microcircuit 12 can be supplied with power via the contact connection (via at least one of the contacts 14) or, independently of this first power supply possibility, by a remote power feed using the magnetic antenna 16 (in contrast to the first embodiment).

Thus here the use of the "contactless" communication mode will not be conditioned by the simultaneous use of the contact connection (via the contacts 14).

The electronic entity can therefore be supplied with power either via the contact connection or by a remote power feed, which leads to the two main operating modes described with reference to FIGS. 5 and 6, respectively; simultaneous supply of power by contact and via the remote power feed is naturally possible without calling into question the operating principles of the two modes described hereinabove.

Figure 5:
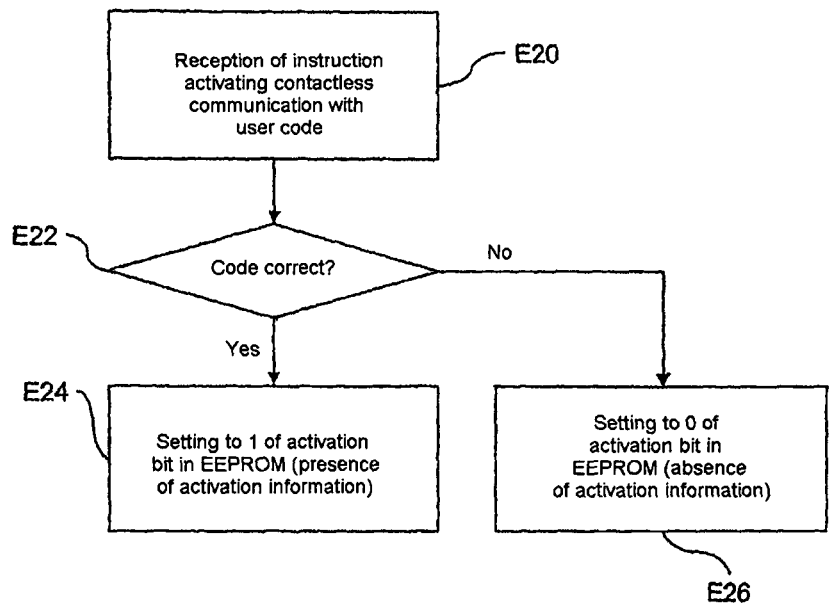
FIG. 5 is a flowchart defining a first part of the working of the electronic entity from FIG. 3.

When the electronic entity is communicating with a terminal via the contacts 14, the method shown in FIG. 5 is used under the control of the microcircuit 12 (programmed by means of instructions stored in memory, for example).

Beforehand, for example during a step of initializing the data stored in the electronic entity (for example the personalization step conventionally used in the fabrication of microcircuit cards before they are marketed), an activation bit stored in the rewritable memory 18, for example, is set to 0, which indicates that remote communication is inhibited by default (as described in more detail hereinafter).

During the personalization step, there can equally be provision for writing configuration information that indicates (for example in the form of rights to access the file in which the activation bit is stored) to what degree the use of the remote communication means of the electronic entity can be authorized via the contact connection, namely for example:
  at any time, for example by providing free access to the file that contains the activation bit (the control program of the electronic entity can nevertheless in this case make sending conditional based on the entry of a secret code, as described hereinafter);
  following authentication of the reader (or of the holder of the card, who where applicable enters a code on the reader), which constitutes a variant of the embodiment described hereinabove for authorizing use of the remote communication means only to authenticated users;
  never, for example by prohibiting access to the file that contains the activation bit, which makes it impossible to modify the latter to authorize use of the contactless communication means, where appropriate.

The situation described hereinafter is that in which access to the activation bit is free for the control program of the electronic entity.

At a certain point of operation in "contact" mode (in which the microcircuit 12 is supplied with power by the terminal and exchanges data with the latter via the contacts 14), the microcircuit can receive from the terminal an instruction to activate contactless communication, that is to say an item of data (or more generally an item of information) intended to command authorization of operation in "contactless" mode via the antenna 16, as explained with reference to FIG. 6 (step E20).

In the example described here, a code supplied to the terminal by the user (for example by means of a keypad) is transmitted in association with the activation instruction so that the authorization of operation in "contactless" mode is effective only if the correct code is supplied by the user, i.e. a predetermined code stored (where applicable in protected form) in the rewritable memory 18 associated with the microcircuit 12 (or in another memory, of the read-only memory type, associated with that microcircuit 12).

When it has received the activation instruction accompanied by the code supplied by the user, the microcircuit 12 proceeds to a step E22 of verifying that the code supplied is correct, i.e. in practice comparing the code supplied to the code stored in the electronic entity as already mentioned.

If the code supplied does correspond to the secret code stored in the electronic entity, the authorization of contactless communication becomes effective by setting to 1 in the step E24 the activation bit previously referred to, which signifies that the electronic entity has indeed received correct information as to activation of contactless communication.

On the other hand, if the code supplied by the user and sent to the electronic entity with the activation instruction in the step E20 is not the code stored by the latter, there follows in the step E26 the setting to 0 of the activation bit in the rewritable memory 18, which signifies that it is considered at this stage that correct activation information has not been received.

In both cases the activation bit is modified by an instruction of the "UPDATE BINARY" type (defined in the ISO standard 7816-4), for example, after selection of the file that contains this activation bit by a command of the "SELECT" type.

Note that, in the situation previously referred to in which the activation bit is set to 0 during an initialization step, the step E26 is not necessary because it does not change the value of the activation bit a priori. It may nevertheless be required to use it, for example to be sure that any use of an incorrect code leads to setting of the activation bit to 0 even if the correct code was given during a previous phase. Moreover, in the presence or absence of the step E26, the reception of an incorrect code could have other consequences, for example sending an error message from the card to the terminal via the contacts 14.

Furthermore, although with the aim of conciseness there has been described a single step of verifying that the code is correct without specifying whether it was possible to repeat that step or not, there can of course be envisaged the possibility of allowing the user a limited number of attempts to enter the correct secret code, for example with the consequence of locking the electronic entity when the limited number of attempts has been used up and the code is still wrong.

The "contactless" mode of operation is described next with reference to FIG. 6. As indicated hereinafter, this mode of operation is triggered by the electronic entity coming into the range of a remote reader, whether it has carried out the steps from FIG. 5 aiming to activate the contactless connection beforehand or not.

When the electronic entity enters the field of the reader (step E30), the electronic entity is supplied with power by a remote power feed (which can be seen as detection of the reader by the electronic entity) and the microcircuit 12 begins to operate in "contactless" mode.

At the beginning of this operation (preferably during the first steps of the program executed by the microcircuit 13, for example during execution of initialization and anticollision programs, as defined in the ISO standard 14443-3), the microcircuit 12 proceeds to read the activation bit in the rewritable memory 18 (step E32).

It can then proceed in the step E34 to verifying the value of the activation bit (which is indicative of information as to activation of contactless communication, as already indicated).

If the activation bit is at 0 (either because that value was written during initialization of the electronic entity and has not been modified by the reception of a correct activation instruction, or because this bit was reset to 0 following the entry of a wrong code or exchange of authorized data beforehand without a new authorization having been given), contactless communication is stopped in the step E36, only its first steps having been carried out, without this involving any exchange of data.

On the other hand, if the microcircuit 12 verifies that the activation bit stored in the rewritable memory 18 is at the value 1 (i.e. in the presence of activation information), contactless communication continues, meaning first of all initialization of the contactless connection protocol in the step E38 (for example in accordance with the ISO standard 14443-4 in order to reach the level of execution of the "Half-Duplex Block Transmission Protocol").

Figure 6:
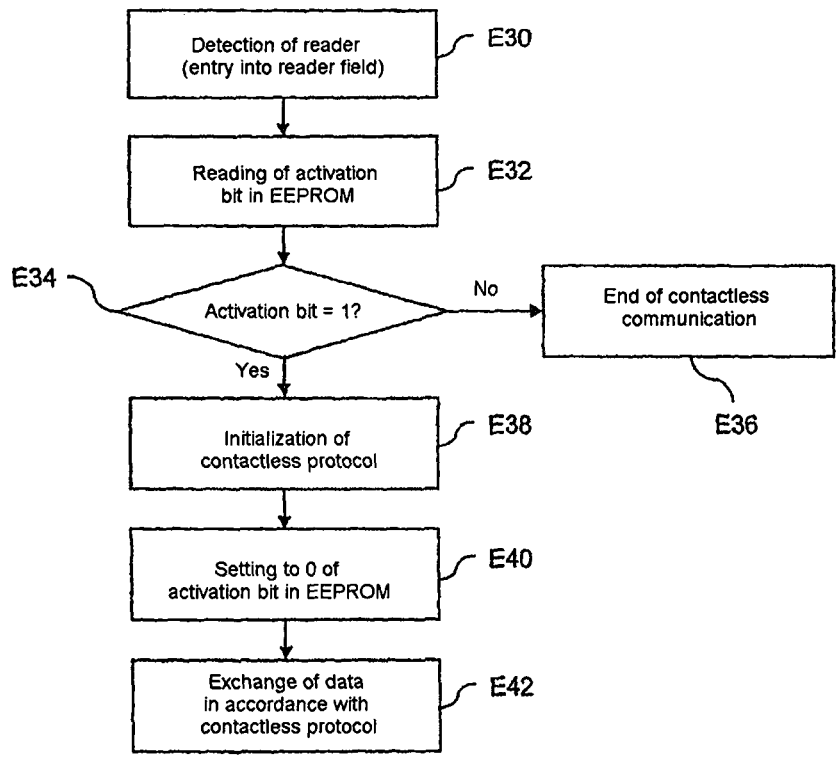
FIG. 6 is a flowchart defining a second part of the working of the electronic entity from FIG. 3.

Once contactless communication has been established (for example after the step E38), there follows the setting to 0 of the activation bit in the rewritable memory 18, as represented by the step E40 in FIG. 6. The execution of the step E40 after the initialization of the protocol ensures that the electronic entity will not be authorized to establish contactless communication again after leaving the field of the reader (unless it receives a new activation instruction by way of the contact connection).

However, as already indicated, setting the activation bit to 0 (i.e. inhibiting establishing contactless communication again) could occur under other conditions, for example a time-delay relative to the time of reception of the activation instruction (or where applicable relative to the setting up of the contactless connection), the execution of a predetermined number of instructions by the microcircuit 12 (or of application protocol data unit (APDU) commands) or the reception of an end of transaction message (as was the case in the first embodiment).

In another variant, it can be envisaged that the activation bit is not reset to 0 during operation in contactless mode, but rather on reception of a deactivation instruction in "contact" mode. Such a deactivation instruction could moreover be provided even for the case where the activation bit is reset to 0 during contactless operation (as described with reference to FIG. 6, for example).

In the example described, once the protocol has been initialized in the step E38, and even though the activation bit is reset to 0 in the step E40, there follows an exchange of data in accordance with the contactless protocol in a step E42. It will nevertheless be noted that, when the exchange of data of the step E42 has finished, for example on the electronic entity leaving the field of the reader, or alternatively on reception by the latter of a command terminating contactless communication, the activation bit having been reset to 0 by the step E40, a new iteration of the steps E30 to E34 by the electronic entity returning to the field of the reader will lead to failure of the contactless communication by the passage to the step E36.

In the embodiment that has just been described, the activation bit (used as an indicator of the previous reception of a correct activation instruction) conditions all exchanges of data in contactless mode. Alternatively, there could be provision for this activation bit to condition only the exchange of certain particular data of the electronic entity, whereas other data could be freely communicated by the electronic entity when it passes near a remote reader, even if no specific instruction has been received via the contactless connection beforehand.

Thus when the electronic entity is an electronic identification document, there can be provision for certain data present on the document (such as the name of the person concerned) to be commmunicated without necessitating activation of a particular authorization beforehand, whereas the sending of other data (for example confidential information of the biometric data type—fingerprints, iris or facial image) can be sent by the electronic entity via the contactless connection only on condition that the electronic entity has before that received a valid activation instruction to that effect via the contact connection.

In this case, the presence of activation information (i.e. the value 1 of the activation bit) will not condition the setting up of the contactless connection as such, but certain steps of sending the confidential data.

For example, there can then be provision for the activation instruction to correspond to the authorization to send this data only once, i.e. the activation bit would then be reset to 0 immediately after sending the confidential data.

In a variant (that can, where applicable be combined with the embodiment that has just been described), there can be provision for the activation information to condition reception of data via the contactless connection. For example, it is then possible to avoid an identification code being presented to the electronic entity via the contactless connection by a malicious third party, unknown to the authorized holder of the electronic entity, for example at the risk of locking the electronic entity following the presentation of a number of wrong codes by that third party.

Moreover, the data to which the exchange authorization relates is not necessarily limited to the application data of the electronic entity (i.e. in particular the data carried by the electronic entity in its information medium function), but can equally include data of other types, such as data for setting up a communication protocol.

The embodiments that have just been described, with the variants envisaged, constitute only possible examples of implementation of the invention, which is not limited to them.

The invention claimed is:

1. An electronic entity, comprising:
   means for contact communication;
   means for contactless communication;
   a rewritable non-volatile memory storing activation information; and
   a microcircuit configured to set the activation information to a predetermined value upon receipt of an activation instruction via the means for contact communication,
   the microcircuit receives the activation instruction via the means for contact communication, the activation instruction causing the activation information to be set to a predetermined value in the rewritable non-volatile memory authorizing an exchange of certain data at least via the means for contactless communication, the activation information being set based on the activation instruction subject to configuration information written in the rewritable non-volatile memory, the configuration information indicating access rights to control setting of the activation information, and
   the microcircuit authorizes the exchange of certain data via the means for contactless communication in the presence of the predetermined value of said activation information.

2. The electronic entity according to claim 1, wherein the microcircuit inhibits the exchange of said data via the means for contactless communication in the absence of the predetermined value of said activation information.

3. An electronic entity, comprising:
   means for contact communication;
   means for contactless communication including an antenna; and
   a microcircuit configured to
      receive an activation instruction via the means for contact communication, the activation instruction causing the activation information to be set to a predetermined value in a memory authorizing an exchange of certain data at least via the means for contactless communication, the activation information being set based on the activation instruction subject to configuration information written in the memory, the configuration information indicating access rights to control setting of the activation information, and
   the microcircuit authorizes an exchange of certain data at least via the means for contactless communication as a function of the prior reception of the activation instruction and the configuration information via the means for contact communication, the microcircuit configured to command connection of the antenna to the microcircuit based on the instruction, and
   wherein the means for contactless communication is inhibited by default.

4. The electronic entity according to claim 1, wherein the electronic entity is a microcircuit card.

5. A method of controlling an electronic entity comprising means for contact communication, means for contactless communication, and a rewritable non-volatile memory storing activation information, the method comprising:
   receiving an activation instruction via the means for contact communication, the activation instruction causing the activation information to be set to a predetermined value in the rewritable non-volatile memory authorizing an exchange of certain data at least via the means for contactless communication, the activation information being set based on the activation instruction subject to configuration information written in the rewritable non-volatile memory, the configuration information indicating access rights to control setting of the activation information; and
   authorizing the exchange of certain data at least via the means for contactless communication by a microcircuit setting the activation information stored in the non-volatile memory to the predetermined value on reception of said activation instruction, subject to the configuration information.

6. The method according to claim 5, further comprising exchanging said data via the means for contactless communication conditioned by said authorization.

7. The method according to claim 6, wherein said conditional exchanging comprises:
   verifying that the value of the activation information is equal to the predetermined value, and
   exchanging said data via the means for contactless communication only in the case of positive verification.

8. The method according to claim 7, further comprising setting the activation information to a value that is a complement of the predetermined value at a particular time.

9. A method of controlling an electronic entity comprising means for contact communication, means for contactless communication, and a rewritable non-volatile memory storing activation information, the method comprising:
   receiving an activation instruction via the means for contact communication, the activation instruction causing the activation information to be set to a predetermined value in the rewritable non-volatile memory authorizing an exchange of certain data at least via the means for contactless communication, the activation information being set based on the activation instruction subject to configuration information written in the rewritable non-volatile memory, the configuration information indicating access rights to control setting of the activation information;
   authorizing the exchange of certain data at least via the means for contactless communication by setting the activation information to the predetermined value on reception of said activation instruction, subject to the configuration information; and inhibiting the exchange of said data at a particular time.

10. The method according to claim 8, wherein the particular time corresponds to the reception of an end of communication command by the means for contactless communication.

11. The method according to claim 8, wherein the particular time is determined by a time-delay.

12. The method according to claim 8, wherein the particular time is reached after reception of a predetermined number of commands via the means for contactless communication.

13. The method according to claim 8, wherein the particular time corresponds to the completion of communication initialization.

14. A method of controlling an electronic entity comprising means for contact communication, means for contactless communication, and a rewritable non-volatile memory storing activation information, the method comprising:

receiving an activation instruction via the means for contact communication, the activation instruction causing the activation information to be set to a predetermined value in the rewritable non-volatile memory authorizing an exchange of certain data at least via the means for contactless communication, the activation information being set based on the activation instruction subject to configuration information written in the rewritable non-volatile memory, the configuration information indicating access rights to control setting of the activation information; and authorizing the exchange of certain data at least via the means for contactless communication by setting the activation information to the predetermined value on reception of said activation instruction, subject to the configuration information, wherein the activation information is adapted to be modified when a code received with said activation instruction corresponds to a code stored in the electronic entity.

15. The method of claim 14, wherein the electronic entity is locked when the received code is incorrect after a predetermined number of attempts.

16. The method of claim 5, wherein the electronic entity includes a control program adapted to modify the activation information when a code received with said activation instruction corresponds to a code stored in the electronic entity.

17. The method of claim 16, wherein the control program is adapted to lock the electronic entity when the received code is incorrect after a predetermined number of attempts.

18. An electronic entity, comprising:
a contact communication module;
a contactless communication module;
a rewritable nonvolatile memory storing activation information; and
wherein the electronic entity is configured for an activation instruction to be received via the contact communication module, the activation instruction causing the activation information to be set to a predetermined value in the rewritable non-volatile memory authorizing an exchange of certain data at least via the means for contactless communication, the activation information being set based on the activation instruction subject to configuration information written in the rewritable non-volatile memory, the configuration information indicating access rights to control setting of the activation information, said activation information has by default a value inhibiting a communication via the contactless communication module, and said activation information is modifiable at the rewritable nonvolatile memory, upon receipt of the activation instruction via the contact communication module, subject to the configuration information, to authorize a communication via the contactless communication module.

19. The method of claim 5, wherein the activation information is set to a value distinct from the predetermined value during an initialization step prior to the receiving step.

20. An electronic entity, comprising:
means for contact communication;
means for contactless communication;
a rewritable non-volatile memory storing activation information;
a microcircuit configured to set the activation information to a predetermined value upon receipt of an activation instruction via the means for contact communication,
the microcircuit receives the activation instruction via the means for contact communication, the activation instruction causing the activation information to be set to a predetermined value in the rewritable non-volatile memory authorizing an exchange of certain data at least via the means for contactless communication, the activation information being set based on the activation instruction subject to configuration information written in the rewritable non-volatile memory, the configuration information indicating access rights to control setting of the activation information, and
the microcircuit authorizes the exchange of certain data via the means for contactless communication in the presence of the predetermined value of said activation information,
wherein the access rights include conditional access rights in which the activation information is modifiable subject to a conditional requirement.

21. The electronic entity of claim 20, wherein the conditional requirement is authentication of a card reader, the electronic entity having entered a field of the card reader, or authentication by use of a code entered at the card reader.

22. The electronic entity of claim 1, wherein the electronic entity conforms to one or more of the ISO standard 14443 and the ISO standard 7816.

* * * * *